United States Patent [19]

Haye, Sr.

[11] 3,770,035

[45] Nov. 6, 1973

[54] SKIRTED TANDEM-WHEEL COVER

[76] Inventor: Stanley V. Haye, Sr., 418 E. Nordin Ave., Spokane, Wash. 99218

[22] Filed: Sept. 24, 1971

[21] Appl. No.: 183,427

[52] U.S. Cl. ............................................. 150/54 B
[51] Int. Cl. .............................................. B60b 7/04
[58] Field of Search ....................... 150/54 A, 54 B

[56] References Cited
UNITED STATES PATENTS

| 1,311,267 | 7/1919 | Draver | 150/54 B X |
| 1,997,738 | 4/1935 | Maxedon | 150/54 B X |
| 2,849,045 | 8/1958 | Anderson | 150/54 B |

Primary Examiner—Donald F. Norton
Attorney—Keith S. Bergman

[57] ABSTRACT

A cover for adjacent tandem wheels, especially as used on travel trailers, to shield against sun-rays or other physical deteriorants and improve appearance. A flexible, fabric-like planar facing member covers the outer surface and communicates with a fastening band having an elasticized inner edge to extend over the periphery of tires to be covered and around more than the upper half thereof to maintain positioning but allow simple installation.

3 Claims, 6 Drawing Figures

PATENTED NOV 6 1973 3,770,035
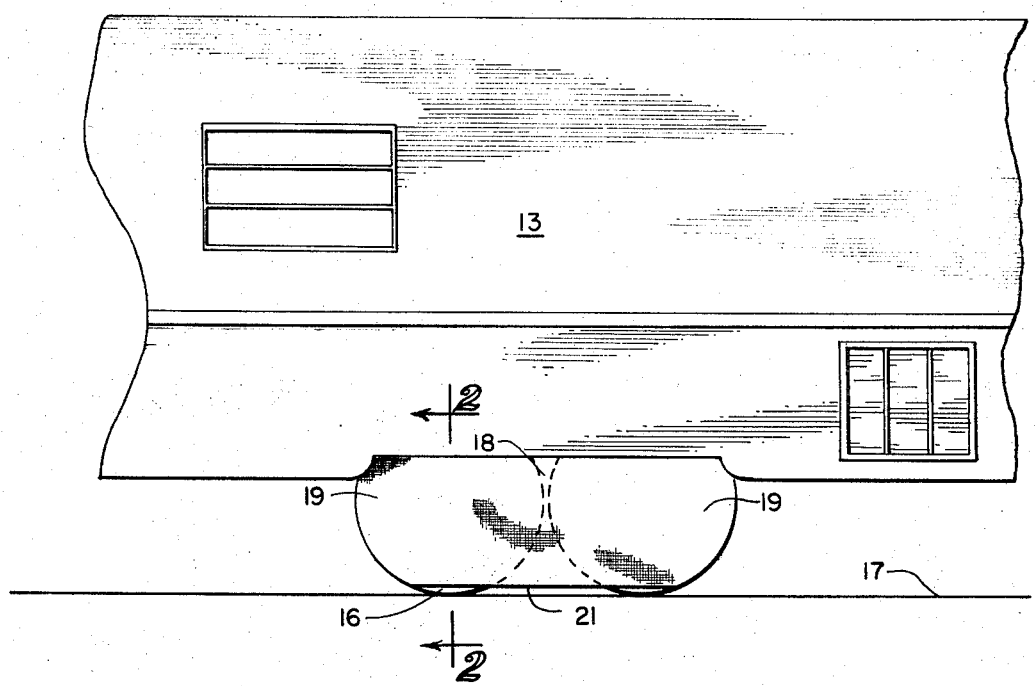
STANLEY V. HAYE Sr., INVENTOR.
BY
ATTORNEY

3,770,035

SKIRTED TANDEM-WHEEL COVER

BACKGROUND OF INVENTION

RELATED APPLICATIONS

There are no applications related hereto filed in this or any foreign country.

FIELD OF INVENTION

This invention relates generally to covers for pneumatic vehicular tires and more particularly to such a cover placible upon tandem tires during static use to shield their outer surface.

DESCRIPTION OF PRIOR ART

Since the advent of pneumatic rubber tires it has been found advantageous to cover them when possible from the elements to prevent or lessen physical deterioration. The non-visible solar rays particularly tend to damage tire rubber by causing cracking, checking and hardening, all more pronounced when a tire be not in use. The problem is of such magnitude that tires not used to a substantial degree on trailers located in the sunny climates, especially in the southwestern United States, will often have a life not longer than one year. Covers for trailer tires also seem, at least in the present day culture, to add some aesthetic desirability and are used to some degree for this reason.

Many covers for pneumatic tires have heretofore become known. Most undoubtedly have been concerned with the covering of a spare tire during periods of non-use. This type of cover normally fits about the entire periphery of the tire not only to cover it but also to provide appropriate support and fastening for the covering element. This type of cover is readily distinguishable from my invention by reason of its essential structural characteristics which do not allow it to cover a tire in static use.

With the advent of increased use of travel trailers and mobile homes the problem of tire protection has been presented in a new light as these vehicles oftentimes are statically maintained for extended periods of time in sunny climates. It has become desirable and nearly necessary to cover the tires and shield them from the elements to lessen the rapidity of their deterioration. My invention seeks to provide a cover, especially for tandem type trailer wheels to resolve this problem.

The cover is distinguished from the prior art in that it is a pliable fabric member which can be easily folded into a small volume for storage as is necessary in a trailer. The cover extends about only a portion of the periphery of the tires being covered to allow installation without moving the tires either vertically or horizontally from its supportive position and to allow use during static periods. It is simply placible from the outside of the vehicle tire and easily maintained by reason of its elasticized peripheral element which passes over more than the upper half of the tandem tires to be covered.

SUMMARY OF THE INVENTION

My invention provides a fabric, shell-like cover panel configured to cover the outer surface of tandem trailer tires. A peripheral fastening member extends perpendicularly from the cover panel to fit across the peripheral tread of the tires to be covered and extends somewhat therebeyond to terminate in an elasticized portion that fits over the rearward side of the tires to maintain the cover in position. The peripheral element is of such length that when properly positioned it covers more than the upper half of adjacent tandem tires so that it operates efficiently to maintain the cover in place.

The lowermost end portions of the peripheral member are provided with stiffening wires of L-shaped configuration to fit in the peripheral seam and extend across the periphery of a tire being covered to aid in maintaining the end seams of the peripheral member upon the tires.

In providing such a device it is:

A principal object of my invention to create a cover to protect tandem tires statically supporting a vehicle from solar radiation.

A further object of my invention to provide a cover of the nature aforesaid that is easily manually installed and simply maintained in position thereafter.

A still further object of my invention to provide such a cover that is formed substantially from fabric-like material that may be compacted in a very small volume for storage.

A still further object of my invention to provide such a cover that is well adapted for use upon adjacent tandem wheels but might be adapted for use upon single trailer wheels with only change in size.

A still further object of my invention to provide such a cover that is of new and novel design, of rugged and durable nature, of simple and economic manufacture and one that is otherwise well adapted to the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement with only one preferred and practical embodiment being illustrated in the accompanying drawings as required.

BRIEF DESCRIPTION OF DRAWINGS

In the accompanying drawings which form a part hereof and wherein like numbers of reference refer to similar parts throughout:

FIG. 1 is an orthographic side view of my invention in place upon the tandem wheels of a typical travel trailer.

FIG. 2 is a cross-sectional view through the cover and wheel elements of FIG. 1 taken on the line 2—2 thereon, in the direction indicated by the arrows.

FIG. 3 is an isometric face or outside surface view of two adjacent tandem wheels removed from position on the trailer and supporting the cover of my invention.

FIG. 4 is an orthographic back or inside view of the structure of FIG. 3.

FIG. 5 is an isometric view of the L-shaped wire element bound in peripheral element seams to aid in maintaining the peripheral fastening member against the tire periphery.

FIG. 6 is a somewhat idealized and enlarged sectional view through the elasticized inner seam of the peripheral element.

DESCRIPTION OF PREFERRED EMBODIMENT

Referring now to the drawings in more detail it will be seen that my invention generally comprises skirted shield member 10 communicating with perpendicularly extending peripheral member 11 which has inward elasticized fastening portion 12 to maintain the cover on and about the tandem wheels of a trailer.

In FIG. 1 there is seen ordinary travel trailer 13 supported on axles 14 carrying adjacent sets of opposed tandem wheels 15 which in turn each carry pneumatic tires 16 to support the entire trailer structure upon some underlying surface 17.

Shield member 10 provides flat sheet-like element 18 of configuration shown in FIG. 3 with opposed circular end parts connected by two substantially straight lines. The edges of element 18 not fastened to peripheral member 11 are seamed or otherwise finished in some appropriate fashion, depending upon the particular material, to provide reasonable durability.

Peripheral member 11 provides elongate sheet-like element 22 of a width somewhat greater than that of the treaded periphery of the tires to be covered to provide part 23 extending across the periphery of the supporting tire and part 24 extending therebeyond a distance upon the back surface of the tire to aid in forming elasticized fastening structure 12. The length of member 11 is such that its end parts 25 extend downwardly upon the tires to be covered a distance greater than half of the upper segment — that is, the part above a horizontal line passing through the tire center. The adjacent edges of shield member 10 and peripheral member 11 are fastened together by an appropriate seam or other known fastening means depending upon the nature of the materials of which these elements are formed.

Elasticized fastening structure 12 provides, along the edge of element 24 of peripheral member 11, rolled seam 27 creating an internal, somewhat cylindrical void 28 within which is carried elongate elastic element 29. The ends of elastic element 29 are fastened in the end parts of seam 27 and the unextended length of the elastic member is somewhat less than the normal length of seam 27 so that there is constantly elastic tension within the seam.

The end parts of element 11 each carry L-shaped fastening clips 30 each providing arcuate side arm 31 structurally communicating with arcuate peripheral arm 32 all with such configuration as to fit with the side arm in the end part of seam 26 and the peripheral arm extending adjacent the periphery of the tire in the seam in the end part of peripheral member 11. The invention is operative without this fastening clip but the clip serves to provide additional rigidity, re-inforces the seams and provides a greater fastening capability.

The material from which shield and peripheral members are formed is preferably a durable pliable material such as a coated fabric or plastic. Most materials of this nature are sufficiently opaque to solar radiation to serve the purposes of my invention, but if necessary or desired either an inner or outer lining (not shown) of some flexible more opaque material may be added such as aluminum foil or metallic gilded plastic. The exposed outer surface of the cover material should not only be weather-proof but also provide some reasonably aesthetically pleasing surface.

Having thusly described the structure of my invention, its use may be readily understood.

Firstly, a cover is formed according to the specifications and with appropriate dimensioning for the particular wheels to be covered. It is then manually manipulated to place the shield member in approximate position and the upper part of the peripheral member is manipulated upon the upper portion of the tires to be covered to bring the elasticized structure across the upper periphery of the tire and downwardly, adjacent the inwardly facing surface of the tire. After this is accomplished in the upper part of the structure the elasticized element is moved into position similarly along the rest of the periphery of each of the tires. The operation may be quite simply accomplished by inexperienced operators. In this position then, the shield member will be maintained, immediately adjacent the outwardly facing surface of the tires, by gravity and the entire cover member will be maintained in place upon the adjacent tandem tires by the elasticized fastening structure extending about the inner surface of the tires.

The cover may be quite simply removed by reversing the operation.

It is to be particularly noted that with the fabric structure of the cover and the limited nature of the rigid fastening elements, the cover may be readily folded into a relatively small volume for storage when not in use as it must be with the limited storage capacity of the typical travel trailer.

It is also to be noted from the structure described, that a cover might be configured with appropriate dimensioning and the same fashioning to cover a single tire if desired.

It is further to be noted that the skirt portion of the cover, that is, the part vertically below the end parts of the peripheral member, might be variously configured other than in the planar fashion as shown for ornamentation.

The foregoing description of my invention is necessarily of a detailed nature so that a specific embodiment might be set forth as required, but it is to be understood that various modifications of detail, rearrangement and multiplication of parts may be resorted to without departing from its spirit, essence or scope.

Haing thusly described my invention, what I desire to protect by Letters Patent, and

What I claim is:

1. A cover for the outwardly facing surface of adjacent, axially spaced, static wheels of a trailer comprising, in combination:

a sheet-like flexible shield member configured to fit immediately outwardly adjacent only a substantial part of the tire group to be covered;

an elongate sheet-like flexible peripheral member joined to the upper part of the periphery of the shield member to extend perpendicularly therefrom and over somewhat more than the upper segment of the threaded periphery of the tire group to be covered and over the peripheral part of the rearward side of said tire group; and an elasticized fastening structure about the inner periphery of the peripheral member to bias that member to a length less than its normal length to maintain the cover in releasable position on the tire group to be covered.

2. The invention of claim 1 further characterized by:

a seam between the adjoining edges of shield and peripheral members communicating with perpendicularly extending seams in the opposed end parts of the peripheral member extending across the tread of a tire group to be covered; and paired, opposed rigid L-shaped clip elements, each comprising an elongate arcuate seam arm extending perpendicularly to an elongate arcuate peripheral arm, both joined and configured so that the seam arm fits within the end part of the seam between shield and peripheral member and the peripheral arm extends in the seam in the end part of the peripheral member across the periphery of a tire group being covered.

3. A flexible fabric tire cover for static tandem tire groups comprising, in combination:

a sheet-like shield member configured to cover only a substantial portion of the outer surface of a supporting adjacent set of tandem tires;

an elongate peripheral member communicating with more than the upper half of the shield member to extend perpendicularly across the periphery of the set of tires to be covered and some distance over the peripheral part of the rearward side thereof;

an elasticized fastening structure along the inner edge of the peripheral member inwardly adjacent the inner surface of the supporting tires to elastically bias the inner seam of the peripheral member to a length shorter than its normal length to aid in maintaining the cover upon the set of tires;

a seam between the adjoining edges of shield and peripheral members communicating with perpendicularly extending seams in the opposed end parts of the peripheral member extending across the tread of a tire group to be covered; and paired rigid L-shaped fastening clips, each having an arcuate seam arm carried in one of the end parts of the seam between shield member and peripheral member and substantially perpendicular peripheral arms extending across the periphery of each of the supporting set of tires when the cover be in operative covering position.

* * * * *